(12) United States Patent
Lee

(10) Patent No.: US 6,402,181 B1
(45) Date of Patent: Jun. 11, 2002

(54) TRAILER HITCH AND LOCK ASSEMBLY

(76) Inventor: Lih Shya Lee, 7F, No. 46, Pin Ho 10 Street, Chang Hua (TW), 500

( * ) Notice: Subject to any disclaimer, the term of this patent is extended or adjusted under 35 U.S.C. 154(b) by 0 days.

(21) Appl. No.: 09/692,842

(22) Filed: Oct. 17, 2000

(51) Int. Cl.[7] .............................................. B60D 1/173
(52) U.S. Cl. .............................. 280/507; 70/14; 70/34
(58) Field of Search ............................ 280/507; 70/34, 70/32, 31, 38 R, 14, 258, 232, 58

(56) References Cited

U.S. PATENT DOCUMENTS

| | | | | |
|---|---|---|---|---|
| 1,895,655 A | * | 1/1933 | Fraim | |
| 3,820,283 A | * | 6/1974 | Acerra et al. | 70/34 |
| 4,351,171 A | * | 9/1982 | Tsui | 70/38 R |
| 4,440,005 A | * | 4/1984 | Bulle | 70/34 |
| 4,576,021 A | * | 3/1986 | Holden | 70/34 |
| 4,617,810 A | * | 10/1986 | Fish et al. | 70/14 |
| 4,811,578 A | * | 3/1989 | Masoncup et al. | 70/38 B |
| 5,794,959 A | | 8/1998 | Scheef, Jr. | 280/400 |
| 5,857,692 A | | 1/1999 | Hayes et al. | 280/410 |
| 6,955,832 | * | 5/2000 | Wyers | 70/34 |

FOREIGN PATENT DOCUMENTS

SU 855168 * 8/1981 ............ 70/31

* cited by examiner

Primary Examiner—Daniel G. DePumpo

(57) ABSTRACT

A hitch and lock device for coupling a trailer to a vehicle includes a lock rod engaged through the elements from the vehicle and the trailer, and a lock device engaged with the lock rod to secure the elements together. The lock device may be quickly engaged onto the lock rod to lock the lock rod to the elements and to solidly secure the trailer to the vehicle. The lock device includes a latch slidably received in a housing, and a spring biasing the latch to engage with the lock rod, and an actuator actuated by a core with a key to disengage the latch from the rod against the spring.

11 Claims, 4 Drawing Sheets

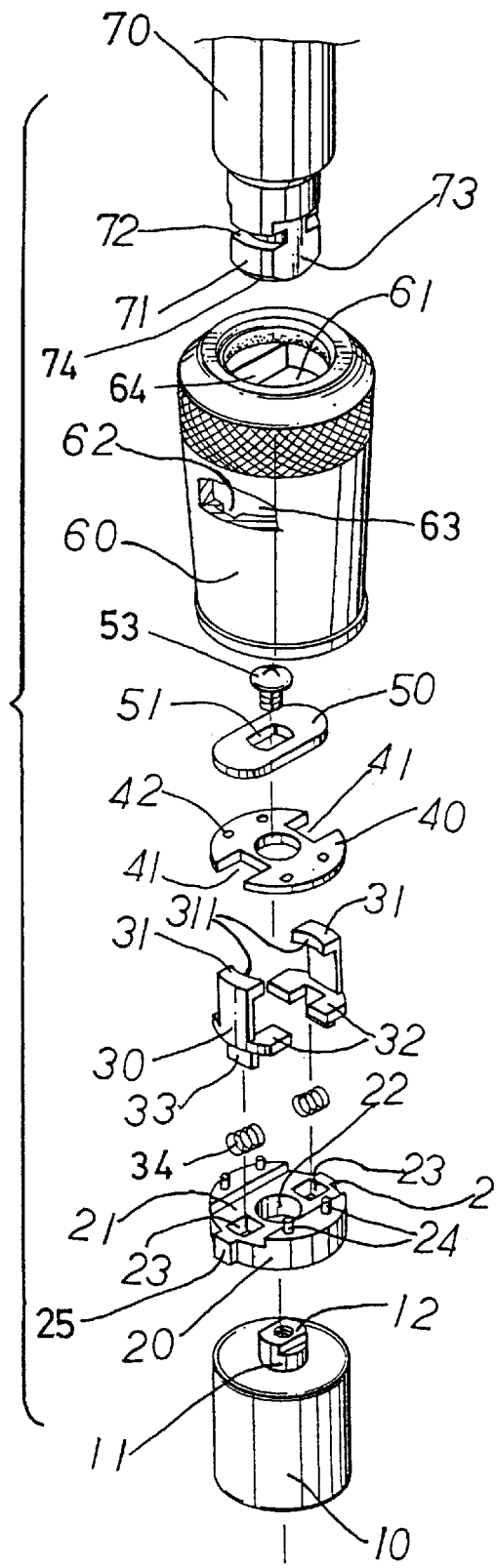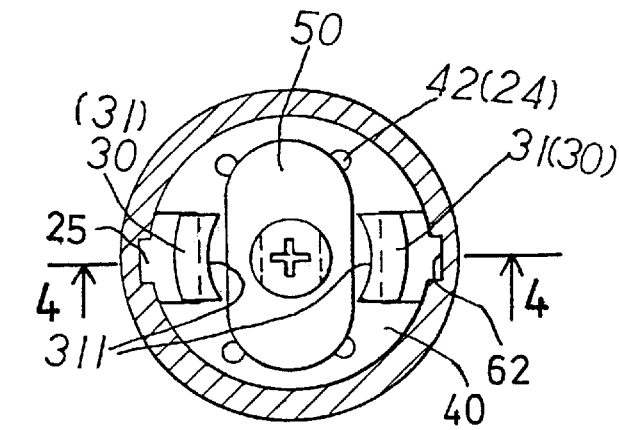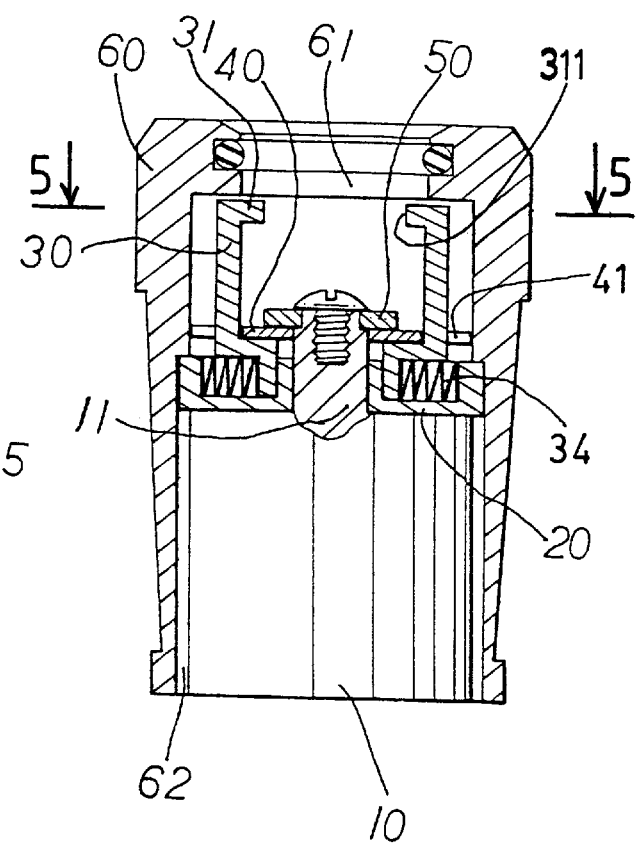
FIG. 3
FIG. 5
FIG. 4

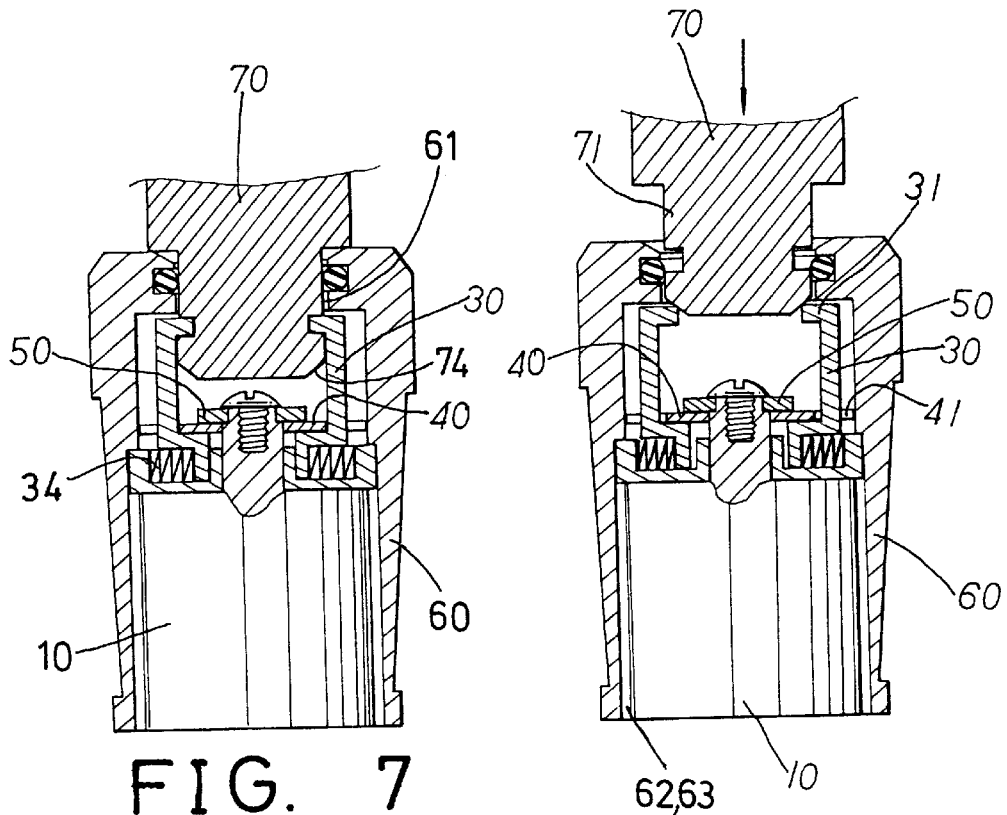
FIG. 7
FIG. 6
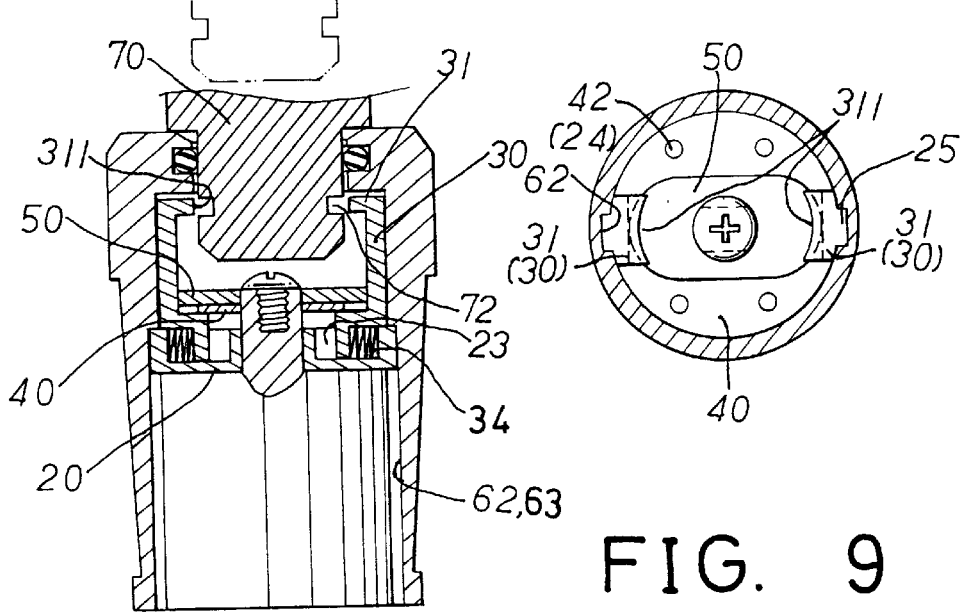
FIG. 8
FIG. 9

TRAILER HITCH AND LOCK ASSEMBLY

BACKGROUND OF THE INVENTION

1. Field of the Invention

The present invention relates to a hitch device, and more particularly to a trailer hitch and lock assembly.

2. Description of the Prior Art

Typical carts, golf cars, trailers are required to be attached to or coupled to the vehicle with a hitch assembly. U.S. Pat. No. 5,794,959 to Scheef, Jr. discloses a complicated hitch assembly for coupling a trailer to a vehicle and for supporting a wheeled vehicle on the trailer. However, a pin is the only element provided for engaging through the elements from the trailer and the vehicle such that the pin may not be used to solidly lock the trailer to the vehicle.

U.S. Pat. No. 5,857,692 to Hayes et al. discloses a towing apparatus for coupling a golf car to a vehicle or. for towing the golf car. A number of bolts are required to be provided and engaged through the elements from the trailer and the vehicle. It takes a long time to thread and unthread the bolts and/or nuts. Some locking pins are engaged through the bolts or nuts for solidly securing or for locking the bolts and nuts together. It may further take time to release the nuts from the bolts. The trailer may not be easily and quickly disengaged or released from the vehicle.

The present invention has arisen to mitigate and/or obviate the afore-described disadvantages of the conventional trailer hitch assemblies.

SUMMARY OF THE INVENTION

The primary objective of the present invention is to provide a trailer hitch and lock assembly for quickly coupling and locking a car or a cart or a trailer to a vehicle.

In accordance with one aspect of the invention, there is provided a-trailer hitch and lock assembly for coupling a trailer to a vehicle, the assembly comprising a first element for attaching to the vehicle, a second element for attaching to the trailer, a lock rod engaged through the first element and the second element, and a lock device engaged with the lock rod to secure and to lock the first element and the second element together, the lock device including a housing, a core rotatably received in the housing, a seat secured in the housing, at least one latch slidably received in the seat, means for biasing the latch to engage with the lock rod, and means for selectively disengaging the latch from the lock rod. The trailer may be easily and. quickly coupled to and locked to the vehicle without a key.

The seat includes a channel formed therein for slidably receiving the latch. The seat includes at least one opening formed therein, the latch includes a leg extended therefrom and slidably received in the opening of the seat, the biasing means includes a spring received in the opening of the seat and engaged with the leg for biasing the latch to engage with the lock rod.

The housing includes at least one recess formed therein, the seat includes at least one lug extended therefrom and engaged into the recess of the housing for securing the seat in the housing and for preventing the seat from rotating relative to the housing.

A retaining device is further provided for retaining the latch to the seat and includes a cover, and means for securing the cover to the seat. The cover includes at least one hole formed therein, the seat includes at least one pin extended therefrom and engaged into the hole of the cover for securing the cover to the seat. The cover includes at least one notch formed therein for slidably receiving the latch.

The selectively disengaging means includes an actuator secured to the core and rotated in concert with the core, for allowing the actuator to be rotated by the core to engage with the latch and to disengage the latch from the lock rod.

The core includes a non-circular projection, the actuator includes a non-circular aperture formed therein for receiving the projection and for allowing the actuator to be rotated in concert with and to be rotated by the core.

The lock rod includes an inclined peripheral surface formed therein for engaging with the latch and for moving the latch. against the biasing means when the lock rod is engaged into the housing, the housing includes at least one surface formed therein, the lock rod includes at least one surface formed therein for engaging with the surface of the housing and for preventing the lock rod from rotating relative to the housing. The lock rod includes a groove formed therein for receiving the latch.

Further objectives and advantages of the present invention will become apparent from a careful reading of a detailed description provided hereinbelow, with appropriate reference to accompanying drawings.

BRIEF DESCRIPTION OF THE DRAWINGS

FIG. 3 is an exploded view of the trailer hitch and lock assembly;

FIG. 4 is a cross sectional view taken along lines 4—4 of FIG. 5;

FIG. 5 is. a cross sectional view taken along lines 5—5 of FIG. 4;

FIGS. 6, 7, 8 are cross sectional views similar to FIG. 4, illustrating the operation of the trailer hitch and lock assembly; and FIG. 9 is a cross sectional view similar to FIG. 5, illustrating the operation of the trailer hitch and lock assembly.

DETAILED DESCRIPTION OF THE PREFERRED EMBODIMENT

Figure 1:
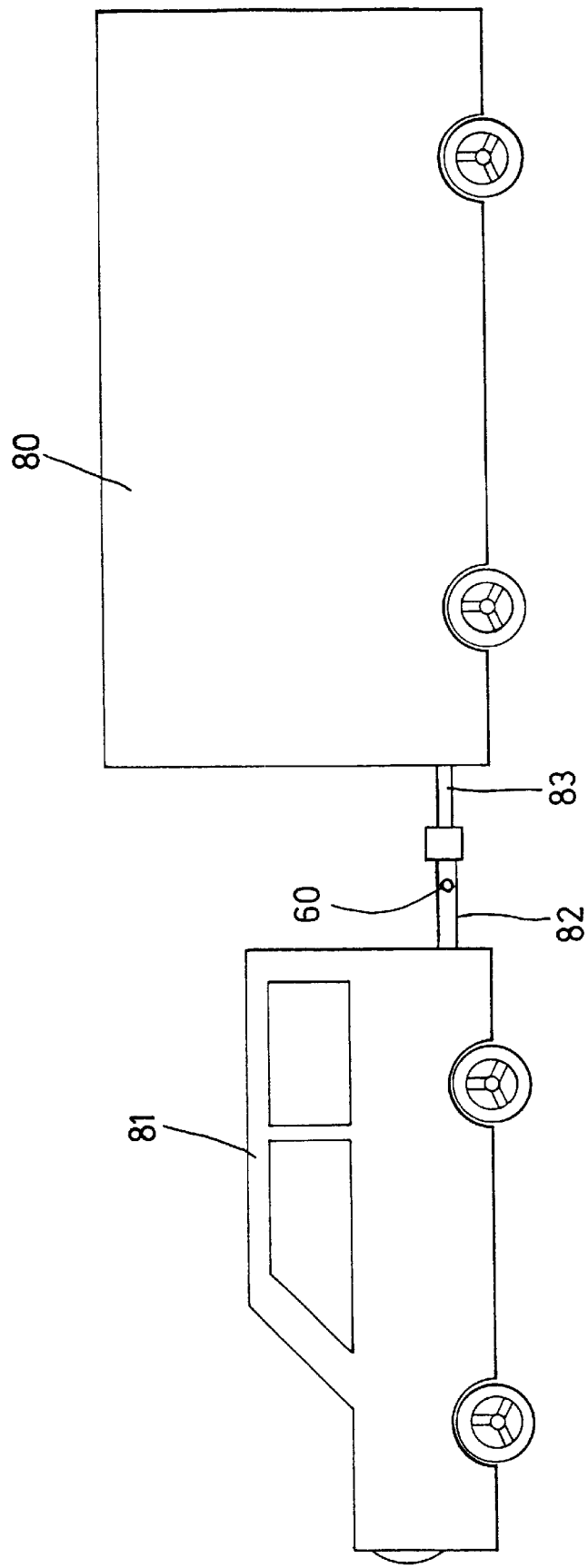
FIG. 1 is a plane schematic view illustrating a trailer coupled to a vehicle with a trailer hitch and lock assembly in accordance with the present invention.
Figure 2:
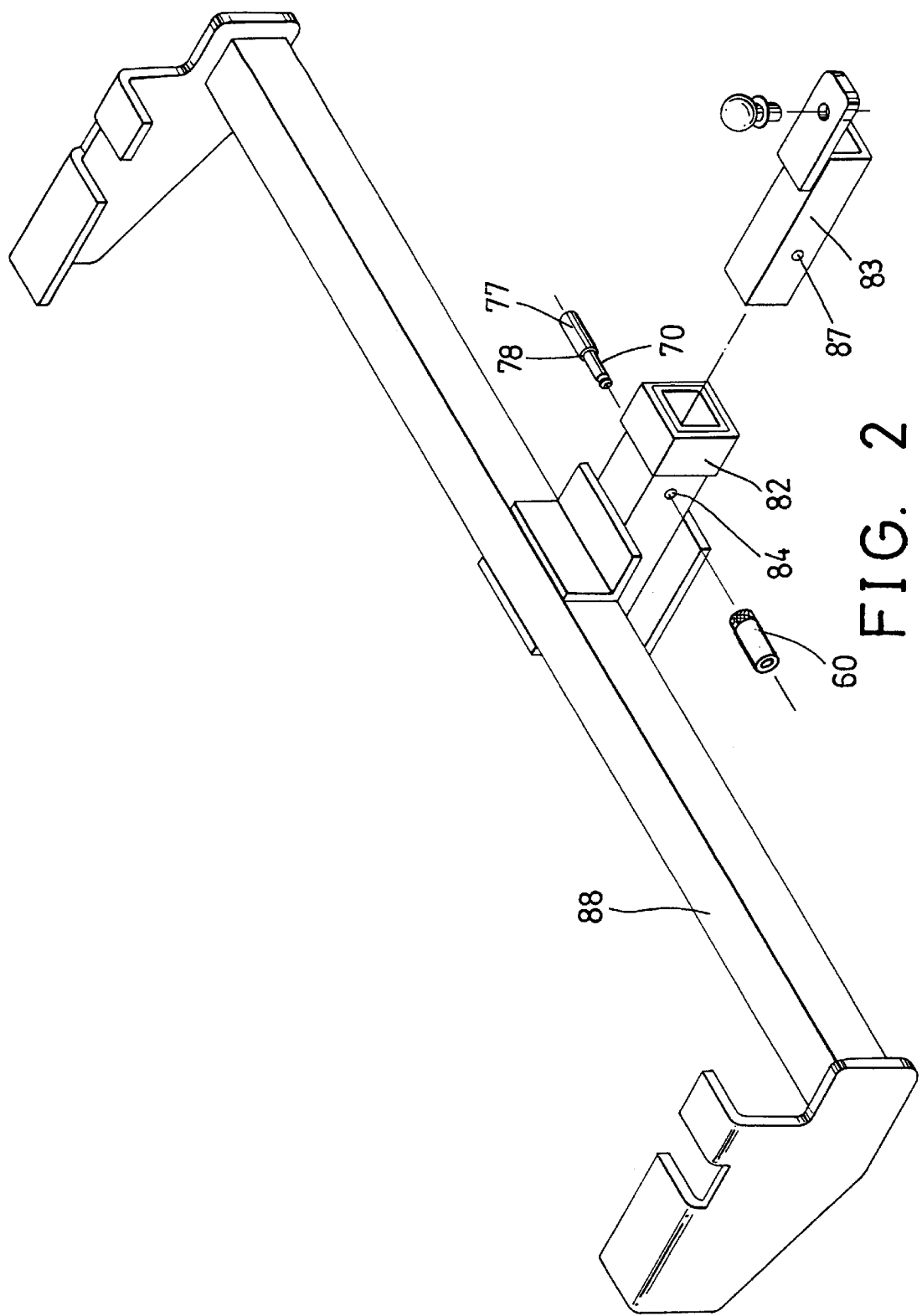
FIG. 2 is a partial exploded view illustrating the coupling of the elements from the trailer and the vehicle with the trailer hitch and lock assembly.

Referring to the drawings, and initially to FIGS. 1–3, a trailer hitch and lock assembly in accordance with the present invention is provided for coupling a a car or a cart or a trailer 80 to a vehicle 81. The vehicle 81 includes an element, such as a tube 82 extended therefrom and having a hole 84 formed therein. The trailer 80 includes an element such as a beam 83 extended therefrom for engaging into the tube 82 and having a hole 87 formed therein for aligning with the hole 84 of the tube 82. The trailer hitch and lock assembly, comprises a lock rod 70 engaged through the holes 84, 87 of the tube 82 and the beam 83, and a lock housing 60 engaged with the lock rod 70 for quickly securing and locking the trailer 80 to the vehicle 81. The lock rod 70 may include a head 77 of a greater diameter than that of the rod 70 for defining or forming a peripheral shoulder 78 between the rod 70 and the head 77 and for engaging with the tube 82. The head 77 may be partially engaged into the tube 82 and partially extended outward of the tube 82. The trailer hitch and lock assembly may further includes a bracket or a frame 88 for attaching or securing to the vehicle 81 and for supporting. the tube 82.

Referring next to FIGS. 3–5, the lock housing 60 includes a bore 61 formed therein for receiving the lock rod 70 and includes a chamber 63 formed therein and having an inner diameter greater than that of the bore 61 thereof for rotatably receiving a core 10 therein. The housing 60 includes one or more, particularly two recesses 62 formed therein and communicating with the bore 61 and the chamber 63 thereof. The core 10 includes an extension 11 extended therefrom and includes a projection 12 extended from the extension 11. The lock rod 70 includes an inclined peripheral surface or a frustum-shaped surface 74 formed in one end 71 thereof and includes a groove, or a peripheral groove-72, and one or more cutoff portions or flat surfaces 73 formed in the end 71 thereof. The housing 60 includes one or more cutoff portions or flat surfaces 64 formed therein for engaging with the flat surfaces 73 of the rod 70 and for preventing the rod 70 from rotating relative to the housing 60.

A seat 20 is received in the chamber 63 of the housing 60 and includes a pair of lugs 25 extended radially outward therefrom for engaging into the recesses 62 of the housing 60 and for preventing the seat 20 from rotating relative to the housing 60. The seat 20 includes a channel 21 formed in the upper portion thereof and includes a bore 22 and one or more, particularly two openings 23 formed therein, and includes one or more pins 24 extended therefrom.

One or more, particularly two latches 30 each includes a base 32 slidably received in the channel 21 of the seat 20 and each includes a leg 33 extended downward therefrom and slidably engaged in the respective openings 23 of the seat 20. The latches 30 each includes a pawl 31 extended therefrom for engaging into the groove 72 of the rod 70 (FIG. 7) and each having a curved surface 311 for mating the curved outer peripheral surface of the end 71 of the rod 70. One or more, particularly two springs 34 are received in the respective openings 23 of the seat 20 and engaged with the legs 33 of the latches 30 for biasing the pawls 31 of the latches 30 to engage into the groove 72 of the rod 70 (FIG. 7). A cover 40 includes one or more holes 42 formed therein for receiving the pins 24 and for securing the cover 40 to the seat 20 and for stably retaining or securing the latches 30 to the seat 20. The cover 40 may be riveted or welded to the seat 20 with the pins 24. The cover 40 includes one or more, particularly two notches 41 formed therein for slidably receiving the latches 30 and for allowing the latches 30 to be slided relative to the seat 20 and the cover 40.

An actuator 5.0 includes an aperture 51 for receiving the projection 12 of the core 10. The actuator 50 may be riveted tour welded to the core 10 with the projection 12, or may be secured to the projection. 12 with one or more fasteners 53. The projection 12 and. the aperture 51 of the actuator 50 include a mating non-circular cross section such that the actuator 50 may be solidly secured to the core 10 and rotated in concert with the core 10. The actuator 50 preferably includes a length close to or equal to or slightly smaller than the outer diameter of the casing 40 and may be rotated by the core 10 to actuate or to disengage the pawls 31 of the latches 30 from the lock 15 rod 70 (FIGS. 8, 9).

In operation, as shown in FIGS. 6 and 7, the inclined peripheral surface 74 of the lock rod 70 may facilitate the engagement of the rod 70 into the bore 61 of the housing. 60 and may move and disengage the pawls 31 of the latches 30 away from the lock rod 70 against the springs 34 respectively such that the pawl 31 of the latch 30 may be easily engaged into the groove 72 of the rod 70 and may easily and quickly lock the rod 70 to the housing 60 without engaging a key to the core 10. As shown in FIGS. 8. and 9, when the core 10 is rotated by a key that is engaged into the core 10, the actuator 50 may be rotated to move and to force the latches 30 against the springs 34 and to disengage the pawls 31 of the latches 30 from the rod 70 such that the rod 70 may be released and disengaged from the housing 60.

The lock rod 70 may thus be easily and quickly engaged to and locked to the housing 60 without a key, and may be easily and quickly disengaged from the housing 60 without threading and unthreading the bolts and without disengaging a lock pin to release the lock nuts from the lock bolts.

Accordingly, the trailer hitch and lock assembly in accordance with the present invention may be used for quickly coupling and locking a car or a cart or a trailer to a vehicle.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A trailer hitch and lock assembly for coupling a trailer to a vehicle, said assembly comprising:

a) a first element for attaching to the vehicle, b) a second element for attaching to the trailer, c) a lock rod engaged through said first element and said second element, and d) a lock device engaged with said lock rod to secure and to lock said first element and said second element together, said lock device including:
  i) a housing,
  ii) a core rotatably received in said housing,
  iii) a seat secured in said housing, said seat including at least one opening formed therein,
  iv) at least one latch slidably received in said seat, said at least one latch including a leg extended therefrom and slidably received in said at least one opening of said seat,
  v) means for biasing said at least one latch to engage with said lock rod, and said biasing means including a spring received in said at least one opening of said seat and engaged with said leg for biasing said at least one latch to engage with said lock rod, and
  vi) means for selectively disengaging said at least one latch from said lock rod.

2. The trailer hitch and lock assembly according to claim 1, wherein said seat includes a channel formed therein for slidably receiving said at least one latch.

3. The trailer hitch and lock assembly according to claim 1, wherein said housing includes at least one recess formed therein, said seat includes at least one lug extended therefrom and engaged into said at least one recess of said housing for securing said seat in said housing and for preventing said seat from rotating relative to said housing.

4. The trailer hitch and lock assembly according to claim 1 further comprising means for retaining said at least one latch to said seat.

5. The trailer hitch and lock assembly according to claim 1, wherein said lock rod includes an inclined peripheral surface formed therein for engaging with said at least one latch and for moving said at least one latch against said biasing means when said lock rod is engaged into said housing, said housing includes at least one surface formed therein, said lock rod includes at least one surface formed therein for engaging with said at least one surface of said housing and for preventing said lock rod from rotating relative to said housing.

6. The trailer hitch and lock assembly according to claim 1, wherein said lock rod includes a groove formed therein for receiving said at least one latch.

7. A trailer hitch and lock assembly for coupling a trailer to a vehicle, said assembly comprising:
   a) a first element for attaching to the vehicle,
   b) a second element for attaching to the trailer,
   c) a lock rod engaged through said first element and said second element, and
   d) a lock device engaged with said lock rod to secure and to lock said first element and said second element together, said lock device including:
      i) a housing,
      ii) a core rotatably received in said housing,
      iii) a seat secured in said housing,
      iv) at least one latch slidably received in said seat,
      v) means for biasing said at least one latch to engage with said lock rod,
      vi) means for selectively disengaging said at least one latch from said lock rod, and
      vii) means for retaining said at least one latch to said seat, said retaining means including a cover, and means for securing said cover to said seat.

8. The trailer hitch and lock assembly according to claim 7, wherein said securing means includes at least one hole formed in said cover, and includes at least one pin extended from said seat and engaged into said at least one hole of said cover for securing said cover to said seat.

9. The trailer hitch and lock assembly according to claim 7, wherein said cover includes at least one notch formed therein for slidably receiving said at least one latch.

10. The trailer hitch and lock assembly according to claim 7, wherein said selectively disengaging means includes an actuator secured to said core and rotated in concert with said core, for allowing said actuator to be rotated by said core to engage with said at least one latch and to disengage said at least one latch from said lock rod.

11. The trailer hitch and lock assembly according to claim 10, wherein said core includes a non-circular projection, said actuator includes a non-circular aperture formed therein for receiving said projection and for allowing said actuator to be rotated in concert with and to be rotated by said core.

* * * * *